(12) United States Patent
Eda et al.

(10) Patent No.: US 11,129,231 B2
(45) Date of Patent: Sep. 21, 2021

(54) METHOD AND SYSTEM FOR OPTIMIZING THE FEEDBACK MECHANISM IN DATA LINK LAYER

(71) Applicant: Samsung Electronics Co., Ltd., Suwon-si (KR)

(72) Inventors: Raja Moses Manoj Kumar Eda, Bangalore (IN); Surendra Pandey, Bangalore (IN); Ashok Kumar Reddy Chavva, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/508,187

(22) Filed: Jul. 10, 2019

(65) Prior Publication Data

US 2020/0022212 A1    Jan. 16, 2020

(30) Foreign Application Priority Data

Jul. 10, 2018   (IN) .............................. 201841025681
Jul. 9, 2019    (IN) .............................. 201841025681

(51) Int. Cl.
*H04W 80/02* (2009.01)
*H04L 1/16* (2006.01)
(Continued)

(52) U.S. Cl.
CPC ........... *H04W 80/02* (2013.01); *H04L 1/1642* (2013.01); *H04L 5/0055* (2013.01); *H04W 80/08* (2013.01)

(58) Field of Classification Search
None
See application file for complete search history.

(56) References Cited

U.S. PATENT DOCUMENTS 9,385,931 B1\*   7/2016   Vivanco .............. H04L 43/0847
2002/0080886 A1   6/2002   Ptasinski et al.
(Continued)

FOREIGN PATENT DOCUMENTS

EP    3298820 A1    3/2018
GB    2571260 A     8/2019
(Continued)

OTHER PUBLICATIONS

ISA/KR, International Search Report and Written Opinion of the International Searching Authority, International Application No. PCT/KR2019/008515, dated Oct. 15, 2019, 7 pages.
(Continued)

*Primary Examiner* — Ayaz R Sheikh
*Assistant Examiner* — Tarell A Hampton

(57) ABSTRACT

Accordingly the embodiments herein provide a for providing a Radio Link Control (RLC) status report based on a configuration of a Packet Data Convergence Protocol (PDCP) entity of a User Equipment (UE) in a wireless network system. The method comprises detecting, at the UE, that a RLC layer is configured to an Acknowledge Mode (AM), informing, at the UE, a t-reordering timer from the PDCP entity of the UE to a RLC entity of the UE, receiving, at the UE, a first Packet Data unit (PDU) by the entity and at least one second PDU by the RLC entity, detecting, by the UE, a PDU gap when the first PDU and the second PDU are not consecutive; providing, by the UE, the RLC status report to a transmitter side of the RLC entity of a network to recover packets missed in the PDU gap based on the t-reordering timer, and recovering, by the network, the packets based on the RLC status report.

17 Claims, 9 Drawing Sheets

(51) Int. Cl.
*H04L 5/00* (2006.01)
*H04W 80/08* (2009.01)

(56) References Cited

U.S. PATENT DOCUMENTS

| | | |
|---|---|---|
| 2002/0191544 A1 | 12/2002 | Cheng et al. |
| 2004/0027997 A1* | 2/2004 | Terry ................ H04W 28/0278 370/276 |
| 2005/0066255 A1* | 3/2005 | Jiang ..................... H04L 1/1851 714/776 |
| 2009/0040982 A1* | 2/2009 | Ho ........................ H04L 1/1896 370/331 |
| 2009/0103478 A1 | 4/2009 | Sammour et al. |
| 2009/0116399 A1* | 5/2009 | Ho .......................... H04L 47/32 370/252 |
| 2014/0254393 A1 | 9/2014 | Yi et al. |
| 2015/0237621 A1 | 8/2015 | Zhu |
| 2016/0142184 A1* | 5/2016 | Yi .......................... H04W 76/19 714/748 |
| 2016/0164793 A1* | 6/2016 | Basu Mallick ....... H04W 28/08 370/235 |
| 2016/0219458 A1 | 7/2016 | Kubota et al. |
| 2016/0261382 A1 | 9/2016 | Vajapeyam et al. |
| 2016/0315868 A1 | 10/2016 | Zhang et al. |
| 2017/0064707 A1 | 3/2017 | Xiao et al. |
| 2017/0085492 A1 | 3/2017 | Xiao et al. |
| 2017/0104656 A1 | 4/2017 | Desroches et al. |
| 2018/0098309 A1 | 4/2018 | Yi et al. |
| 2018/0124642 A1 | 5/2018 | Phuyal et al. |
| 2018/0199251 A1* | 7/2018 | Kim ...................... H04W 36/08 |
| 2019/0306745 A1* | 10/2019 | Kim .......................... H04L 1/18 |
| 2020/0068652 A1* | 2/2020 | Xu ........................ H04L 1/1896 |
| 2020/0329352 A1* | 10/2020 | Wang .................... H04L 1/0009 |

FOREIGN PATENT DOCUMENTS

| | | |
|---|---|---|
| WO | 2009045945 A2 | 4/2009 |
| WO | 2015113296 A1 | 8/2015 |
| WO | 2015113497 A1 | 8/2015 |
| WO | 2016140926 A1 | 9/2016 |

OTHER PUBLICATIONS

Park, Hyun-Seo, et al., "TCP Performance Degradation of In-Sequence Delivery in LTE Link Layer," International Journal of Advanced Science and Technology, vol. 37, Dec. 2011, 10 pages.
Supplementary European Search Report dated Mar. 23, 2021 in connection with European Application No. 19834456.6, 16 pages.
Examination report dated Jul. 1, 2021 in connection with Indian Application No. 201841045681, 6 pages.

* cited by examiner

METHOD AND SYSTEM FOR OPTIMIZING THE FEEDBACK MECHANISM IN DATA LINK LAYER

CROSS-REFERENCE TO RELATED APPLICATIONS

This application is based on and claims priority under 35 U.S.C. § 119 to Indian Patent Application No. 201841025681 filed on Jul. 10, 2018 and Indian Patent Application No. 201841025681 filed on Jul. 9, 2019, the disclosures of which are incorporated by reference herein in their entireties.

BACKGROUND

1. Field

The present disclosure relates to configuration of Acknowledgment Mode (AM) Data Radio Bearer (DRB) in data link layer in $5^{th}$ Generation (5G) networks and more specifically to a method and system for providing Radio Link Control (RLC) status report based on a configuration of Packet Data Convergence Protocol (PDCP) layer in the 5G network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The principal object of the embodiments herein is to provide a RLC status report based on a configuration of the PDCP entity in a wireless network system.

Another object of the embodiment herein is informing a RLC entity about a t-reordering timer by the PDCP entity of the UE.

Another object of the embodiment herein is to providing the RLC status report to recover or discard the PDU missed in the gap based on the t-reordering timer.

Another object of the embodiment herein is to generate the RLC status report by sending NAK message in the status report, only if the PDU is not received within duration of twice the t-reordering time.

Another object of the embodiment herein is to generate the RLC status report by sending ACK message in the status report, if the PDU is not received after the duration of twice the t-reordering time.

Accordingly the invention provides a method and system for providing a RLC status report based on a configuration of a PDCP entity in a wireless network system. The method comprises detecting at a UE that, an AM Data Radio Bearer (DRB) is configured. The UE comprises a RLC entity which is a receiver side of the RLC layer. Further the network comprises a transmitter side of the RLC entity. The method further comprises informing, at the UE a t-reordering time from the PDCP entity of the UE to a RLC entity of the UE. The method further comprises providing by a transmitter side of the RLC entity a RLC status report to a receiver side of the RLC entity to recover or discard the packets missed in the PDU gap based on the t-reordering timer. The method also comprises receiving by the UE the PDU based on the RLC status report based on PDCP configuration and the RLC status report.

In another embodiment a method for packet transmission between a first layer and a second layer in a network comprises receiving, by the first layer, at least one first data packet from a transmitting terminal (entity), detecting, by the first layer, that a preceding data packet is yet to be received and starting a first timer and sending, by the first layer, the at least one first packet to the second layer and detecting the duration of a second timer at the second layer. The method also includes receiving, by the first layer, a second packet from the transmitting terminal (entity), wherein the second packet has a sequence number greater than the first data packet; and sending, by the first layer, a status report to the transmitting terminal (entity) on at least one of the expiry of the first timer or a request from the transmitting terminal (entity) based on the second timer.

In an embodiment the t-reordering timer is sent by the network to the UE. Further providing, by the UE, the RLC status report to a transmitter side of the RLC entity of a network to recover packets missed in the PDU gap based on the t-reordering timer comprises: performing at least one of: sending a Non-Acknowledgement (NAK) message in the RLC status report to the RLC entity of the UE, if the data packet is not received within a duration of twice the t-reordering timer; and sending a Acknowledgement (ACK) message in the RLC status report to the RLC entity of the UE, even if the data packet is not received after twice the t-reordering timer. In an embodiment wherein the transmitting terminal (entity) is a transmitting side of the first layer present in the network In another embodiment recovering, by the network, the packets based on the RLC status report comprises re-transmitting the PDU with a Non-Acknowledgement (NAK) message in the RLC status report; and ignoring the PDU with a Acknowledgement (ACK) message in the RLC status report.

In another embodiment a RLC window is moved forward, when the data packet is not received after twice the t-reordering timer.

In another embodiment wherein the PDCP entity (602) waits for duration of twice the t-reordering timer for receiving the PDU with the NACK message in the RLC status report.

Accordingly the embodiments herein provide a wireless network system comprising a UE. The UE further comprises a memory, a processor and a communicator. The processor further comprises a RLC entity and a PDCP entity. to detect that a RLC layer is configured to an Acknowledge Mode (AM) and inform a t-reordering timer from the PDCP entity to a RLC entity; receive a first Packet Data unit (PDU) by the RLC entity and at least one second PDU by the RLC entity; detect a PDU gap when the first PDU and the second PDU are not consecutive; and provide the RLC status report to a transmitter side of the RLC entity of the network to recover packets missed in the PDU gap based on the t-reordering timer; and receive the packets based on the RLC status report The RLC entity comprises a reassembly timer and a RLC status report generator and a recover engine. The PDCP entity comprises a reordering timer. In an embodiment the UE detects that a AM DRB is configured. The PDCP entity informs the RLC entity of the UE about t-reordering time duration. The RLC entity transmitter side provides a status report to the RLC entity receiver side based on the t-reordering time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
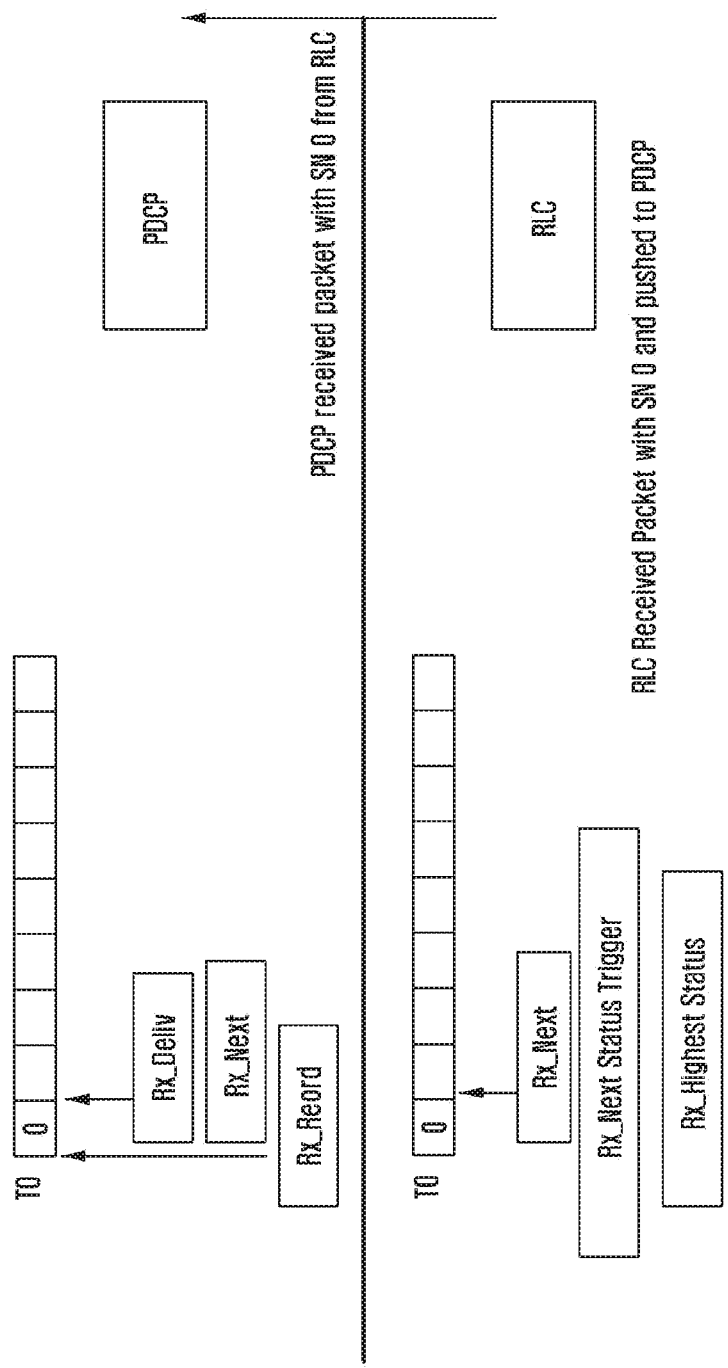
FIGS. 1-4 are time diagrams illustrating an example scenario for window movement at data link layer using conventional methods, according to the prior art.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In New Radio (NR), it has been agreed to follow a unified re-ordering scheme for Data and Signaling radio bearers DRB(s)/SRB(s) in Unacknowledged Mode (UM) and Acknowledged Mode (AM) in a PDCP layer. Due to this, for a DRB configured in AM mode, there arises a problem of packet getting discarded at the PDCP layer if the packet is received from RLC layer (due to packet received after multiple NACKs re-transmissions at RLC) after the PDCP window movement. This PDCP window movement is performed at expiry of t-reordering timer. The t-reordering timer is used by the receiving side of a PDCP entity and receiving PDCP entity in order to detect loss of PDUs.

FIGS. 1-4 are schematic diagrams illustrating the conventional method of window movement in data link layer. As seen in FIG. 1 the RLC layer send data packets to the PDCP layer. The RCL layer comprises a transmitter side and a receiver side. The receiver side of the RLC layer is present in a UE and the transmitter side of the RLC layer is at the network (for example, network entity (node) in the network (e.g. base station)).

As seen in FIG. 1, at time T0 the receiver side of the RLC layer receives a data packet with Sequence Number (SN) 0 from the transmitter side of the RLC layer in the network and immediately forwards it to the PDCP layer. At RLC layer receiver side the value of Rx_Next is the expected count value of receiving next data packet from the lower layers which is 1 in the current example. The value of Rx_Next_Status_trigger is the SN which triggered t-reassembly timer. The value of Rx_Highest_Status is the count of the Maximum STATUS transmit state variable in RLC layer which is 1 in the current example. At PDCP the value of Rx_Next is the expected count value of receiving next data packet from the lower layers which is 1 in the current example. The value of Rx_Deliv is the COUNT value of the first PDCP packet not delivered to the upper layers, but still waited for, which is also 1 in the current example. The value of Rx_reorder (Rx_Reord) is the value of count which triggers the t-reordering timer.

Figure 2:
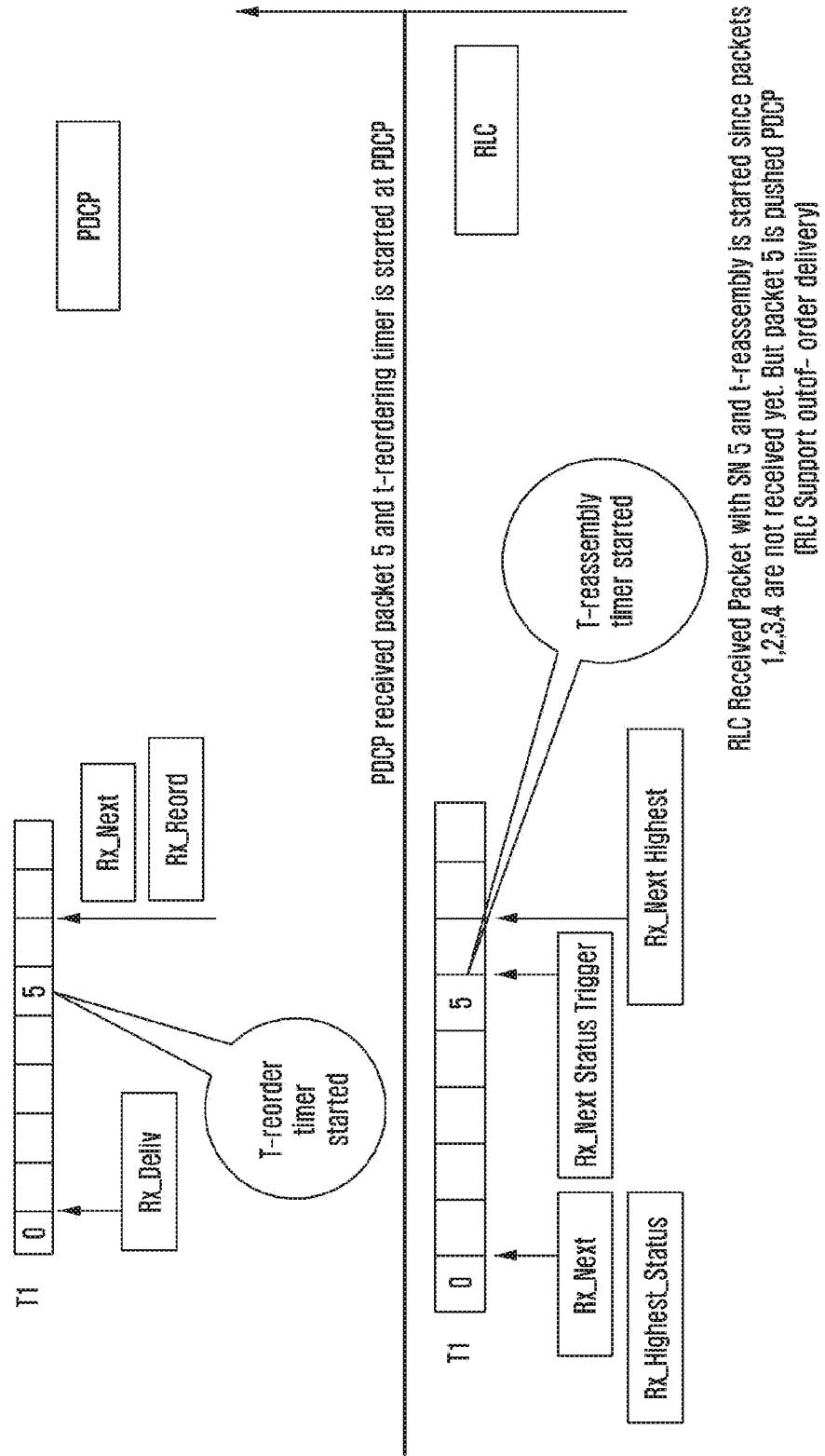

As seen in FIG. 2, at T1, the RLC layer receiver side receives another data packet with SN 5 and a t-reassembly timer is started at the RLC layer receiver side as data packets with SN 1-4 are not received by the RLC layer. The RLC layer receiver side pushes the data packet with SN 5 to the PDCP. At PDCP a t-reordering timer has started since there is gap between the data packet received as data packets with SN 1-4 are not received by the PDCP layer. The time duration of t-reordering timer is provided to a UE by the network. At PDCP when the t-reordering timer duration is expired, then the lower bound of the PDCP window is moved forward. However, the RLC is in AM mode and the lower bound at the RLC is not changed.

Figure 3:
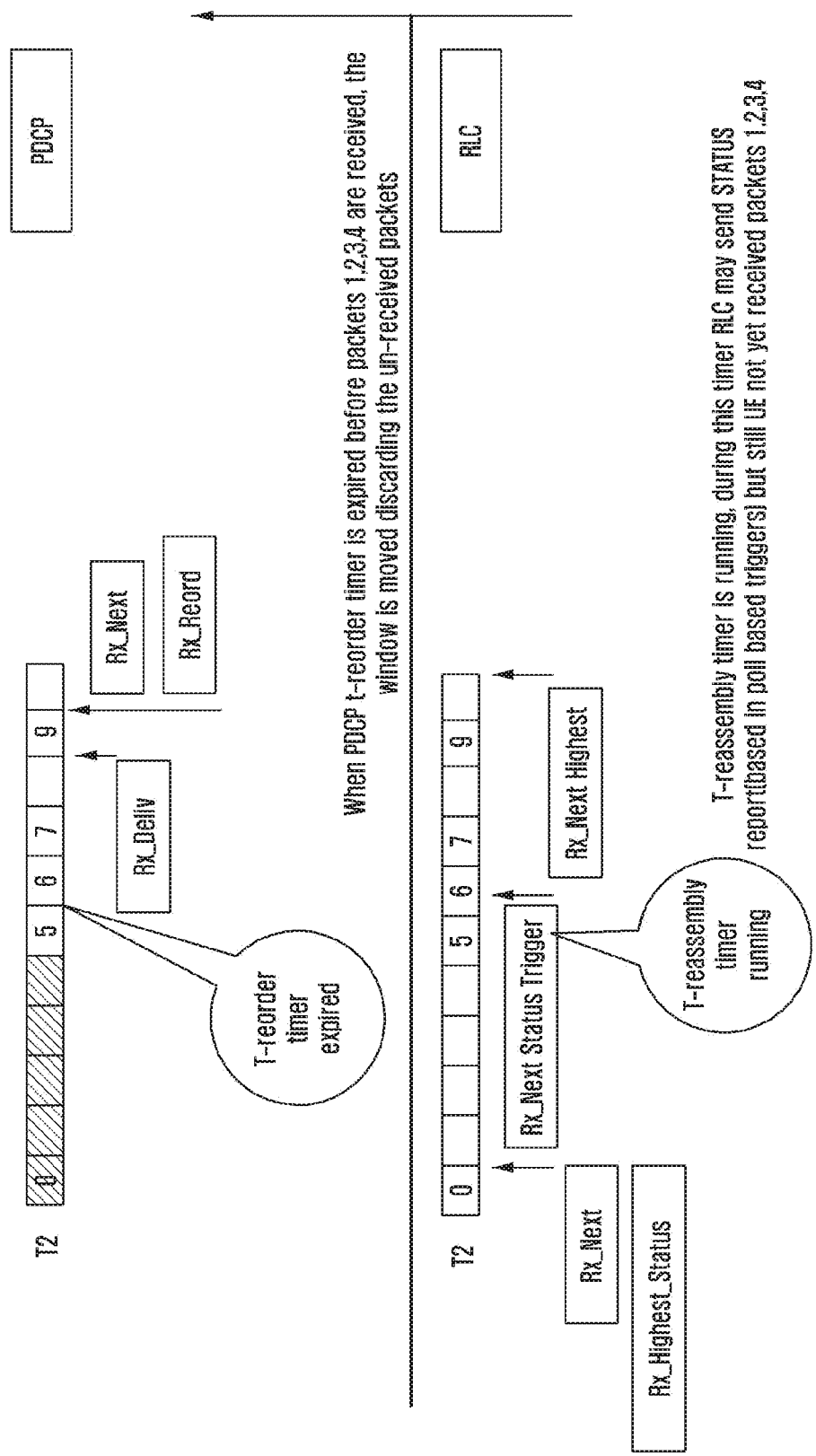

As seen in FIG. 3, at T2, the RLC layer receiver side receives another data packet with SN 6, 7 and 9, and sends the data packets to the PDCP, while the T-reassembly timer is still running. The RLC layer receiver side may send a RLC status report to the RLC transmitter side.

Figure 4:
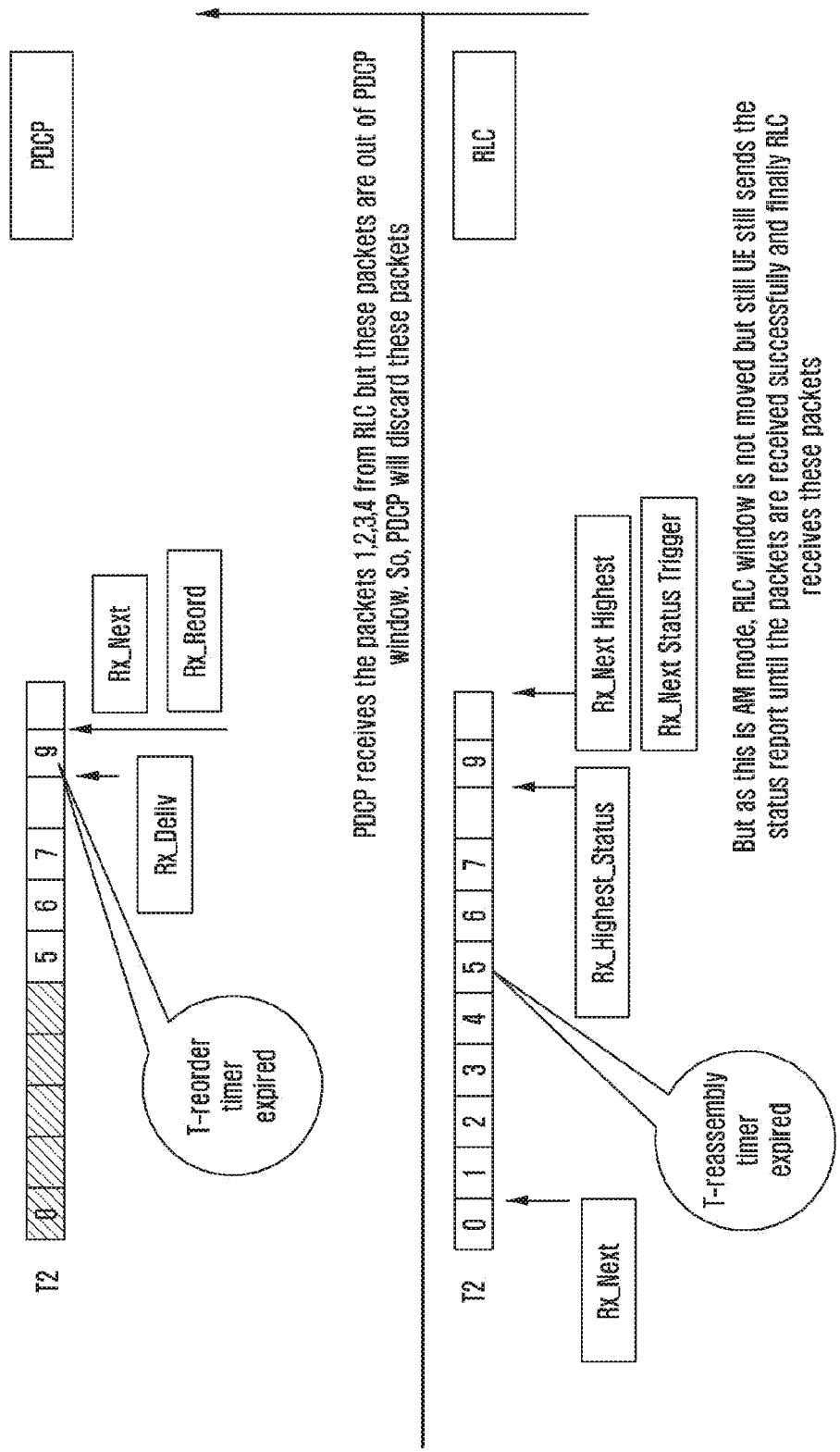

In FIG. 4, at T3, the RLC layer receiver side is in AM mode, and the RLC window is still not moved and hence the UE still send the status report until the packets with SN 1-4 are received. The PDCP received the packets with SN 1-4 from the RLC but at PDCP, the lower bound of the window is 8, and hence the PDCP ignore the data packets sent by the RLC having SN as 1-4. Thus there is wastage of resource and unnecessary processing is done by the UE, asking for data packets with SN 1-4.

Thus, it is desired to address the above mentioned problems and at least provide a useful alternative for indicating change in the dual capability of the UE.

The embodiments herein disclose a method for providing a RLC status report based on a configuration of a PDCP entity in a wireless network system. The method comprises detecting at a UE that, an AM Data Radio Bearer (DRB) is configured. The UE comprises a RLC entity which is a receiver side of the RLC layer. Further the network comprises a transmitter side of the RLC entity. The method further comprises informing, at the UE a t-reordering time from the PDCP entity of the UE to a RLC entity of the UE. The method further comprises providing by a transmitter side of the RLC entity a RLC status report to a receiver side of the RLC entity to recover or discard the packets missed in the PDU gap based on the t-reordering timer. The method also comprises receiving by the UE the PDU based on the RLC status report based on PDCP configuration and the RLC status report.

In another embodiment a method for packet transmission between a first layer and a second layer in a network comprises receiving, by the first layer, at least one first data packet from a transmitting terminal (entity), detecting, by the first layer, that a preceding data packet is yet to be received and starting a first timer and sending, by the first layer, the at least one first packet to the second layer and detecting the duration of a second timer at the second layer. The method also includes receiving, by the first layer, a second packet from the transmitting terminal (entity), wherein the second packet has a sequence number greater than the first data packet; and sending, by the first layer, a status report to the transmitting terminal (entity) on at least one of the expiry of the first timer or a request from the transmitting terminal (entity) based on the second timer.

Referring now to the drawings, and more particularly to FIGS. 5 through 8, where similar reference characters denote corresponding features consistently throughout the figures, there are shown preferred embodiments.

Figure 5:
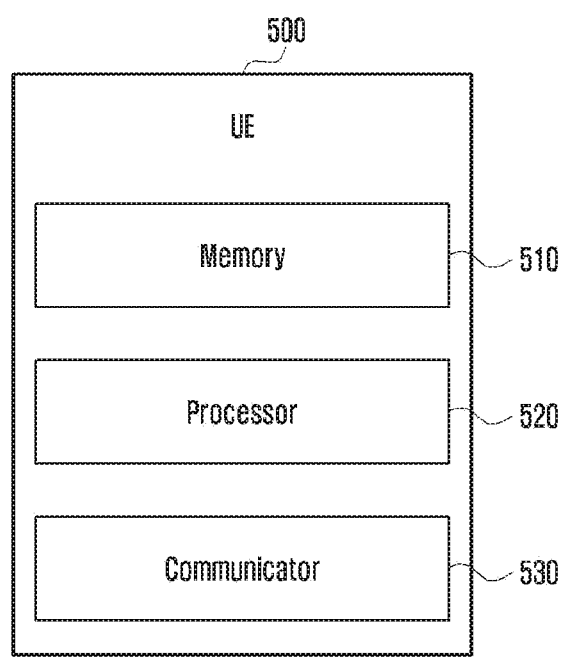
FIG. 5 is a block diagram of a UE 500 for providing a RLC status report based on a configuration of a PDCP entity, according to the prior art.

FIG. 5 is a block diagram of the UE 500 for providing a RLC status report based on a configuration of the PDCP entity. The UE 500 comprises a memory 510, a processor 520 and a communicator 530.

The processor 520 is coupled with the memory 510 and is configured to execute the instructions stored in the memory 510. The memory 510 may include non-volatile storage elements. Examples of such non-volatile storage elements may include magnetic hard discs, optical discs, floppy discs, flash memories, or forms of an Erasable Programmable Memory (EPROM) or an Electrically Erasable and Programmable Read Only Memory (EEPROM).

In addition, the memory 510 may, in some examples, be considered a non-transitory storage medium. The term "non-transitory" may indicate that the storage medium is not embodied in a carrier wave or a propagated signal. However, the term "non-transitory" should not be interpreted that the memory 520 is non-movable. In some examples, the memory 510 can be configured to store larger amounts of information than the memory 510. In certain examples, a non-transitory storage medium may store the data that can, over time, change (e.g., in Random Access Memory (RAM) or cache).

The communicator 530 is configured to communicate internally between hardware components in the UE 500.

In an embodiment the wireless network system comprises the UE 500 including the processor 520 for providing the RLC status report by the receiver side of the RLC entity to the transmitter side of the RLC entity based on a t-reordering tune duration of the PDCP entity.

Figure 6:
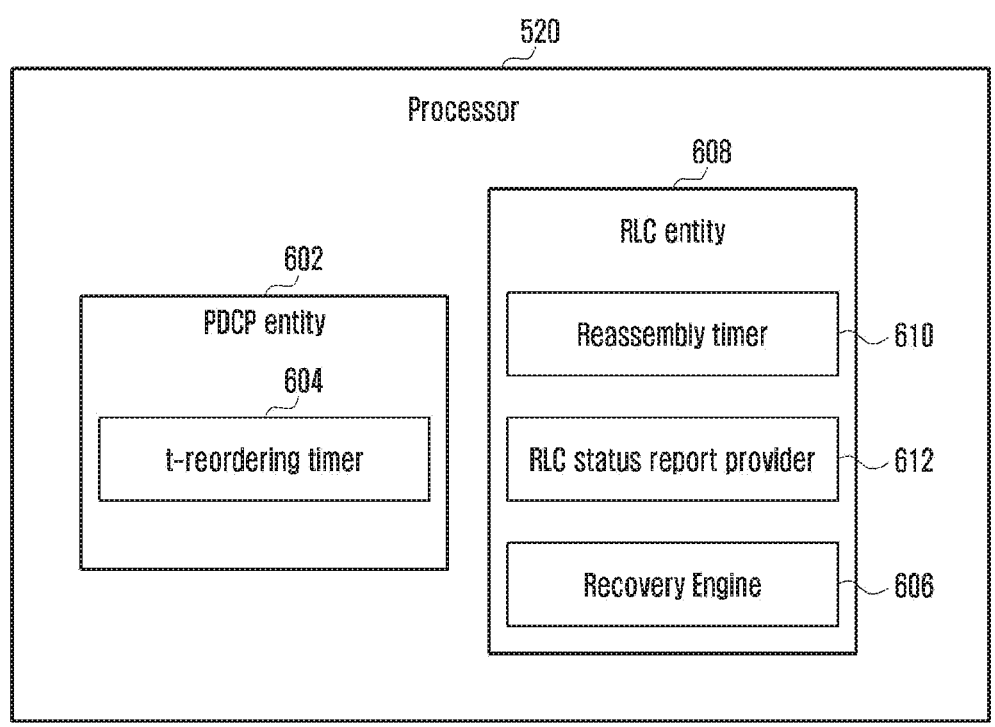
FIG. 6 depicts a block of the processor 520 for recovering PDU at the RLC entity, according to an embodiment as disclosed herein.

FIG. 6 depicts a block of the processor 520 for recovering PDU at the RLC entity. As seen in FIG. 6, the processor 520 comprises a PDCP entity 602 and a RLC entity 608. The PDCP entity 602 relates to a PDCP layer present in the UE. The RLC entity 608 relates to a RLC layer present in the UE 500. The RLC entity 608 is the receiver side of the RLC layer present in the UE. The transmitter side of the RLC layer is at the network. The PDCP entity 602 comprises a t-reordering timer 604. The RLC entity 608 comprises a t-reassembly timer 610. The RLC entity 608 also comprises a RLC status report generator 612.

In an embodiment the wireless network system sends t-reordering timer duration to the PDCP entity 602. In an embodiment the UE 500 present in the wireless network system detects that a Data Radio bearer (DRB) is either configured or reconfigured. Once the DRB is configured, the PDCP entity 602 informs the RLC entity 608 about the t-reordering timer duration. At the UE 500, the PDCP entity 602 receives PDUs from the RLC entity 608. The RLC entity 608 receives the PDUs from the lower layers and forwards it to the PDCP entity 602. The PDUs received by the RLC entity 602 from the lower layers may not be in sequence. At RLC entity, if the PDUs received are not in sequence then the t-reassembly timer 610 is started by the RLC entity 608. Similarly at PDCP entity 602 if the PDUs received are not in sequence then the t-reordering timer 604 is started by the PDCP entity 602 as there is a PDU gap. The triggering of the t-reordering timer 604 at the PDCP entity 602 is detected by the RLC entity 608. Upon detection of the triggering of the t-reordering timer 604 by the PDCP entity 602, the RLC status report generator 612 generates the RLC status report based on the t-reordering timer duration.

In an embodiment, the RLC status report is send to the transmitter side of the RLC layer at the network. Based on the RLC status report, the transmitter side of the RLC layer sends or ignores the data packets to the receiver side of the RLC layer present at the UE.

The RLC status report comprises information about PDUs missed by the RLC entity 608. If a PDU which was missed in the PDU gap is not received by the RLC entity 608, then the RLC entity 608 waits for duration of 2 times the t-ordering time. If the missed PDU is still not received then the RLC entity 608 ignores the missed PDU and sends a positive acknowledged message (ACK) for the particular missed PDU in the status report to its peer entity (for example, network entity (e.g. base station)). Whereas RLC recovers the missed PDU and sends an unacknowledged message (NAK) for the particular missed PDU in the status report to its peer entity before expiry of twice the t-reordering time. Thus the RLC entity 608 send the status report containing details about the missed PDUs to the RLC entity present at the network (not show in figs).

In yet another embodiment, whenever the t-reordering timer is started and expired, the PDCP entity 602 moves the PDU window by incrementing the window limits. This change in window at the PDCP entity 602 is sent to the RLC entity 608 such that the RLC entity is aware of the PDUs that will accepted by the PDCP entity 602. After receiving the window status information from the PDCP entity 602, the RLC entity 608 generates the RLC status report. While generating the RLC status report, the RLC entity at the network ignores the PDU which have lower sequence number than the sequence number of the window at the PDCP entity 608, and sends an acknowledged message (ACK) for the particular PDU in the status report to the RLC layer transmitter side at the network. Whereas the RLC entity at the network recovers the PDU which have higher sequence number than the sequence number of the window at the PDCP entity 608, and sends an unacknowledged message (NAK) for the particular PDU in the status report to its peer entity.

Figure 7:
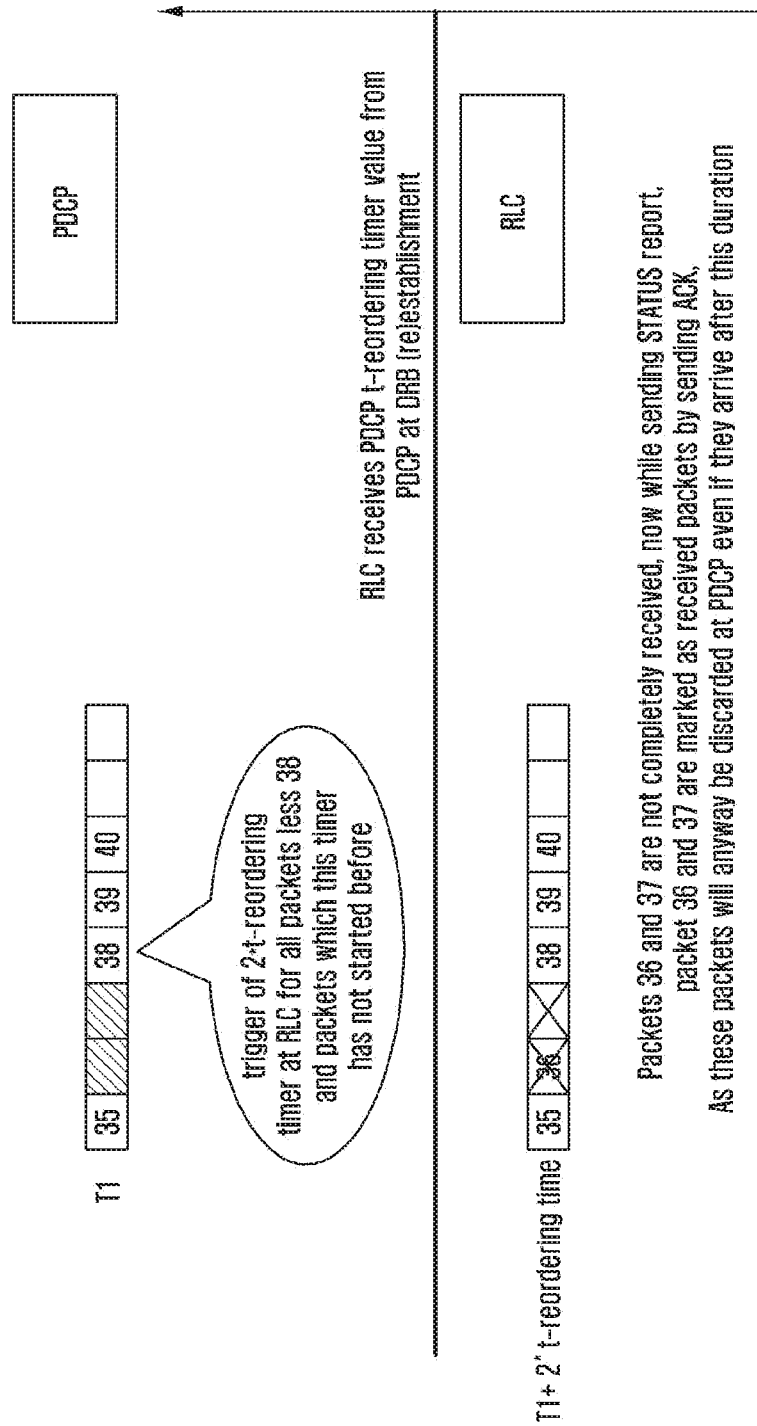
FIG. 7 and FIG. 8 are schematic diagrams illustrating the proposed method with example embodiments, according to an embodiment as disclosed herein.

FIG. 7 is a schematic diagram, illustrating the proposed method with example embodiments. As seen in FIG. 7 the RLC entity 608 receives PDU from the lower layers and sends them to the PDCP entity 602. At time T0 PDU 35 is received by the RLC entity 608 and is forwarded to the PDCP entity 602. At T1 PDU 38 and 39 and 40 are received by the RLC entity 608. Since there is a gap between the PDUs received by the RLC entity 608, the re-assembly timer 610 is started. The RLC entity 608 now waits for time duration of twice the t-reordering time for receiving the missed PDU 36 and 37. Here the PDU 36 and 37 are not received till twice the t-reordering time and hence then the RLC entity 608 sends an acknowledged message (ACK) for the PDU 36 and 37 in the status report to the RLC layer transmitter side. At time T2, even if the RLC entity 608 receives missed PDU 36 and 37, the PDCP entity 602 will not accept wait for them as the missed PDU 36 and 37 are out of window. Thus the time and efforts from the PDCP entity 602 are saved.

Figure 8:
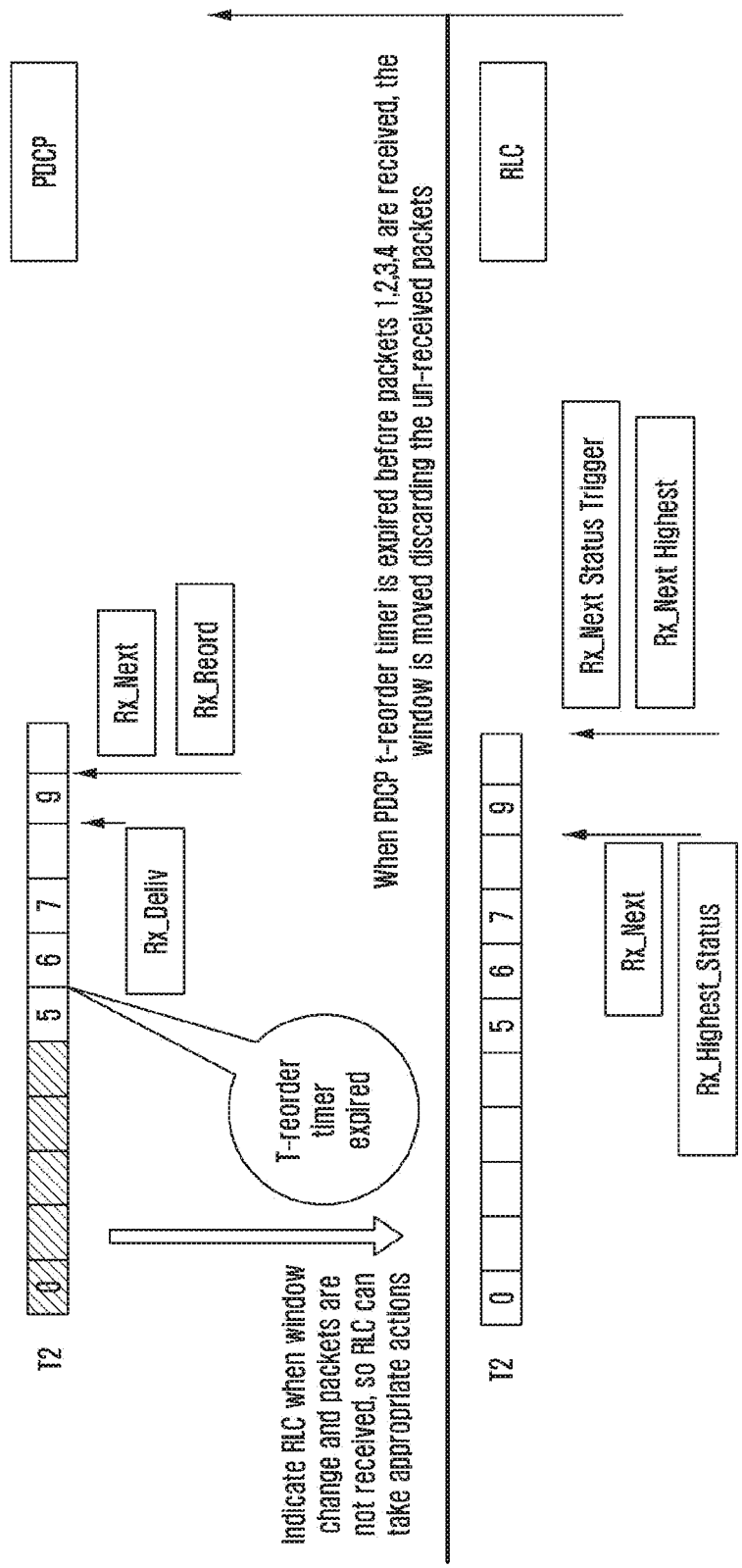

FIG. 8 is a schematic diagram, illustrating the proposed method with example embodiments. At time T0 the RLC entity 608 receives a PDU 0 from the RLC layer transmitter side in the network and immediately forwards it to the PDCP entity 602. At time T1, the RLC entity 608 receives PDUs 5, 6 and 7 from the RLC layer transmitter side in the network and immediately forwards it to the PDCP entity 602. However the t-reordering timer 604 has started at the PDCP entity 602 since there is a gap in the PDU. After the expiry of the t-reordering timer 604, the lower bound of PDU is moved to 8. The PDCP entity now informs the RLC entity 608 about the change in the status of the window. As per proposed solution after receiving notification from PDCP entity 602, the RLC entity 608 updates the RLC receiver state variables. The RLC entity 608 while sending the status report to RLC layer transmitter side sends ACK message for the PDU below the lower bound of the PDCP entity 602.

Thus using the proposed method, the time and resources are saved as discussed above.

Figure 9:
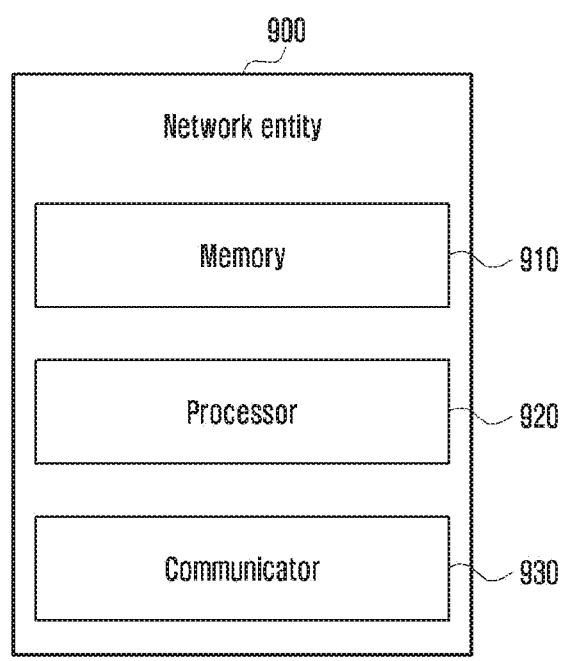
FIG. 9 is a block diagram of the network entity 900, according to an embodiment as disclosed herein.

FIG. 9 is a block diagram of the network entity 900. The network entity 900 comprises a memory 910, a processor 920 and a communicator 930.

The processor 920 is coupled with the memory 910 and is configured to execute the instructions stored in the memory 910. The memory 910 may include non-volatile storage elements. Examples of such non-volatile storage elements may include magnetic hard discs, optical discs, floppy discs, flash memories, or forms of an Erasable Programmable Memory (EPROM) or an Electrically Erasable and Programmable Read Only Memory (EEPROM).

In addition, the memory 910 may, in some examples, be considered a non-transitory storage medium. The term "non-transitory" may indicate that the storage medium is not embodied in a carrier wave or a propagated signal. However, the term "non-transitory" should not be interpreted that the memory 920 is non-movable. In some examples, the memory 910 can be configured to store larger amounts of information than the memory 910. In certain examples, a non-transitory storage medium may store the data that can, over time, change (e.g., in Random Access Memory (RAM) or cache).

The communicator 930 is configured to communicate internally between hardware components in the network entity 900.

In an embodiment the wireless network system comprises the network entity 900 communicating with the UE 500 including the processor 520 for providing the RLC status report by the receiver side of the RLC entity to the transmitter side of the RLC entity based on a t-reordering time duration of the PDCP entity. In an embodiment, the network entity 900 may be an entity (transmitting entity) including a transmitter side of the RLC layer. For example, the network entity 900 may be a base station.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims

What is claims is:

1. A method for providing a radio link control (RLC) status report based on a configuration of a packet data convergence protocol (PDCP) entity of a user equipment (UE) in a wireless network system, the method comprising:
   detecting, at the UE, that an RLC layer is configured to an acknowledge mode (AM);
   informing, at the UE, a t-reordering timer from the PDCP entity of the UE to an RLC entity of the UE;
   receiving, at the UE, a first packet data unit (PDU) by the RLC entity and at least one second PDU by the RLC entity;
   detecting, by the UE, a PDU gap when the first PDU and the second PDU are not consecutive;
   providing, by the UE, the RLC status report to a transmitter side of an RLC entity of a network to recover packets missed in the PDU gap based on the t-reordering timer; and
   receiving, by the UE, the packets based on the RLC status report,
   wherein providing, by the UE, the RLC status report to the transmitter side of the RLC entity of the network to recover packets missed in the PDU gap based on the t-reordering timer, comprises:
   performing at least one of:
      sending a non-acknowledgement (NACK) message in the RLC status report to the RLC entity of the UE, if a packet missed in the PDU gap is not received within a duration of twice the t-reordering timer, or
      sending an acknowledgement (ACK) message in the RLC status report to the RLC entity of the UE, if the packet missed in the PDU gap is not received after twice the t-reordering timer.

2. The method of claim 1, wherein the t-reordering timer is sent by the network to the UE.

3. The method of claim 1, wherein the network recovers the packets based on the RLC status report by:
   re-transmitting the PDU with the NACK message in the RLC status report; and
   ignoring the PDU with the ACK message in the RLC status report.

4. The method of claim 2, wherein an RLC window is moved forward, when the packet missed in the PDU gap is not received after twice the t-reordering timer.

5. The method of claim 3, wherein the PDCP entity waits for duration of twice the t-reordering timer for receiving the PDU with the NACK message in the RLC status report.

6. A method for packet transmission between a first layer and a second layer in a network comprising:
- receiving, by the first layer, at least one first data packet from a transmitting entity;
- detecting, by the first layer, that a preceding data packet is yet to be received and starting a first timer;
- sending, by the first layer, the at least one first data packet to the second layer and detecting a duration of a second timer at the second layer;
- receiving, by the first layer, a second data packet from the transmitting entity, wherein the second data packet has a sequence number greater than a sequence number of the first data packet; and
- sending, by the first layer, a status report to the transmitting entity on at least one of an expiry of the first timer or a request from the transmitting entity based on the second timer,
- wherein the status report marks the at least one first data packet and the second data packet as received if the at least one first and the second data packet are not received after twice the duration of the second timer.

7. The method of claim 6, wherein the transmitting entity is a transmitting side of the first layer present in the network.

8. The method of claim 6, wherein detection, by the first layer and the second layer, is performed by analyzing a header of at least one of the received at least one first data packet or the second data packet.

9. The method of claim 6, wherein the first layer is in a first acknowledged mode (AM).

10. The method of claim 6, wherein the first layer represents a radio link convergence (RLC) entity and the second layer represents a packet data convergence protocol (PDCP) entity.

11. The method as claimed in claim 6, wherein the first timer is a reassembly timer.

12. The method as claimed in claim 6, wherein the second timer is a t-reordering timer.

13. The method of claim 6, wherein the at least one first data packet and the second data packet are not consecutive.

14. A user equipment (UE) for packet transmission between a first layer and a second layer, wherein the UE comprises:
- a memory;
- a processor; and
- a communicator, wherein the processor is coupled to the memory and the communicator, and wherein the processor is configured to:
  - detect that a radio link control (RLC) layer is configured to an acknowledge mode (AM),
  - inform a t-reordering timer from a packet data convergence protocol (PDCP) entity of the UE to an RLC entity,
  - receive a first packet data unit (PDU) by the RLC entity and at least one second PDU by the RLC entity,
  - detect a PDU gap when the first PDU and the at least one second PDU are not consecutive, and
  - provide an RLC status report to a transmitter side of the RLC entity of a wireless network system to recover packets missed in the PDU gap based on the t-reordering timer, and
  - receive the packets based on the RLC status report,
- wherein the processor is configured to at least one of:
  - send a non-acknowledgement (NACK) message in the RLC status report to the transmitter side of the RLC entity, if a packet missed in the PDU gap is not received within a duration of twice the t-reordering time, or
  - send an acknowledgement (ACK) message in the RLC status report to the transmitter side of the RLC entity, if the packet missed in the PDU gap is not received after twice the t-reordering time.

15. The UE as claimed in claim 14, wherein the t-reordering timer is sent by the wireless network system to the UE.

16. The UE as claimed in claim 14, wherein recover the PDU based on the RLC status report comprises:
- re-transmit, by the transmitting side RLC entity, the PDU with the NACK message in the RLC status report; and
- ignore by the transmitting side RLC entity, the PDU with the ACK message in the RLC status report.

17. A UE for packet transmission between a first layer and a second layer, wherein the UE comprises:
- a memory;
- a processor; and
- a communicator, wherein the processor is coupled to the memory and the communicator, and wherein the UE comprises a first layer and a second layer, and wherein the first layer is configured to:
  - receive at least one first data packet from a transmitting terminal (entity),
  - detect that a preceding data packet is yet to be received and start a first timer,
  - send the at least one first data packet to the second layer and detect a duration of a second timer at the second layer,
  - receive a second data packet from the transmitting terminal (entity), wherein the second data packet has a sequence number greater than the first data packet, and
  - send a status report to the transmitting terminal (entity) after an expiry of the first timer based on the second timer,
- wherein the status report marks the first and second data packets as received if the first and second data packets are not received even after twice the duration of the second timer.

* * * * *